United States Patent
Huang et al.

(10) Patent No.: US 7,655,333 B2
(45) Date of Patent: Feb. 2, 2010

(54) SUB-MICRON SOLID OXIDE ELECTROLYTE MEMBRANE IN A FUEL CELL

(75) Inventors: Hong Huang, Palo Alto, CA (US);
Friedrich B. Prinz, Woodside, CA (US);
Masafumi Nakamura, Kawachinagano (JP); Yuji Saito, Narina-Ku (JP)

(73) Assignees: The Board of Trustees of the Leland Stanford Junior University, Palo Alto, CA (US); Honda Motor Co., Ltd, Tokyo (JP)

(*) Notice: Subject to any disclaimer, the term of this patent is extended or adjusted under 35 U.S.C. 154(b) by 0 days.

(21) Appl. No.: 11/170,393

(22) Filed: Jun. 28, 2005

(65) Prior Publication Data
US 2006/0166064 A1    Jul. 27, 2006

Related U.S. Application Data

(60) Provisional application No. 60/584,767, filed on Jun. 30, 2004.

(51) Int. Cl.
*H01M 8/10* (2006.01)
(52) U.S. Cl. .......................... 429/30; 429/33
(58) Field of Classification Search ............ 429/30, 429/33, 129, 34, 38; 252/62.2; 204/424
See application file for complete search history.

(56) References Cited

U.S. PATENT DOCUMENTS

| | | | |
|---|---|---|---|
| 6,007,683 A | 12/1999 | Jankowski et al. | |
| 6,645,656 B1 | 11/2003 | Chen et al. | 429/32 |
| 2002/0187387 A1* | 12/2002 | Yadav et al. | 429/40 |
| 2003/0039874 A1 | 2/2003 | Jankowski et al. | 429/26 |
| 2004/0013924 A1 | 1/2004 | Park et al. | |
| 2004/0018409 A1* | 1/2004 | Hui et al. | 429/33 |
| 2004/0038106 A1* | 2/2004 | Saito et al. | 429/33 |
| 2004/0096572 A1 | 5/2004 | Chen et al. | 427/115 |
| 2004/0202918 A1* | 10/2004 | Mardilovich et al. | 429/40 |
| 2005/0175886 A1* | 8/2005 | Fukuda et al. | 429/40 |

FOREIGN PATENT DOCUMENTS

| | | |
|---|---|---|
| DE | 19634085 | 2/1998 |
| WO | WO 2004/040670 | 5/2004 |

OTHER PUBLICATIONS

X. Chen, "Thin-film heterostructure solid oxide fuel cells," Applied Physics Letters, vol. 84, No. 14, Apr. 5, 2004, pp. 2700-2702.

* cited by examiner

*Primary Examiner*—Patrick Ryan
*Assistant Examiner*—Monique Wills
(74) *Attorney, Agent, or Firm*—Lumen Patent Firm

(57) ABSTRACT

This document describes the nano-scaling effects of solid-state oxygen-ion conductors when the thickness of an ionic conductor membrane as well as size of the grains within the membrane are scaled down to less than 200 nm. By using such solid-state oxygen-ion conductor membranes as solid-state electrolytes, the performances of solid-state ionic devices like fuel cells, gas sensors and catalytic supporters, can be improved and operating temperature can be lowered.

11 Claims, 20 Drawing Sheets porous electrode (* thin lines in the plots are simulated results, symbols are experimental data)

SUB-MICRON SOLID OXIDE ELECTROLYTE MEMBRANE IN A FUEL CELL

RELATED APPLICATIONS

This application claims priority under 35 U.S.C. §119(e) to provisional application No. 60/584,767 filed on Jun. 30, 2004 titled "Thin-Film Solid Oxide Fuel Cell."

FIELD

The invention relates to electrolyte membranes, and, more particularly, to thin film solid oxide electrolyte membranes.

BACKGROUND

Fuel cells have great potential for supplying inexpensive and clean electrical power. One common type of fuel cell is the hydrogen fuel cell. The basic operation of the hydrogen fuel cell includes the migration of hydrogen ions through a semi-permeable membrane known as an electrolyte membrane (or layer). Another type of fuel cell is the solid oxide fuel cell (SOFC). The SOFC works in part by migrating oxygen ions through the electrolyte layer. For any fuel cell, the ideal electrolyte layer will transport only the desired type of ion.

A fuel cell is an electrochemical device that produces electrical current from chemical reaction. The fundamental device includes an ion-conducting electrolyte between two electrodes, backed by fuel and oxidant flow distributors. At the oxidant side a catalyst on the electrode promotes combination of ions and electrons. At the fuel side a catalyst on the electrode promotes separation of ions and electrons. Only the ions conduct through the electrolyte while the electrons are conducted through an external circuit, thus supplying electrical power. SOFC's have oxygen ion-conducting metal oxide membranes as their electrolyte layer. The oxygen molecules transform into oxygen ions by receiving electrons from electrode/catalyst at the oxidant side. The oxygen ions propagate through the electrolyte membrane and combine with hydrogen molecules into water by leaving electrons to electrode/catalyst at the fuel side. A gas sensor has same basic configuration, and produces electrical current that depends on difference of gas concentration.

Fuel cell operation is increasingly efficient when the electronic conductivity of the electrolyte is minimized and the ionic conductivity of the electrolyte is maximized. It is well known that a fuel cell is thermodynamically more efficient at lower temperatures, with lower entropic losses resulting in a higher open cell voltage.

SOFC's have a several of advantages compared to hydrogen fuel cells including: no humidity requirement for ion exchange, no water clogging up with generated water, no or less noble metal catalyst, high CO tolerance, and useable waste heat.

However, conventional SOFC's also have problems. One of the main problems to be overcome is preparation of hermetic seals at high temperatures. With operating temperatures decreasing from 1000° C. to 700° C. or less, metal materials can be used for sealing and the sealing problem becomes manageable. Many efforts have been made to decrease the operating temperature of SOFC's to below 700° C. despite a large loss of output power. However, these operating temperatures are still too high for mobile applications.

FIG. 1 shows a prior art electrolyte and porous electrode combination. The porous nature of the electrode 104 means that the thickness of the electrolyte 102 is quite large. The porous electrode 104 allows gases to reach the electrolyte 102. The electrolyte 102 should have sufficient thickness such that there are no gaps in the electrolyte 102 as the electrolyte 102 is deposited on the electrode 104. The resulting thick electrolyte 102 layer leads to high resistance.

FIGS. 2A-B show a prior art electrolyte and dense electrode combination. This combination can be seen in U.S. Pat. No. 6,645,656. A dense electrode 204 contacts an electrolyte 102 layer. The electrode 204 is etched, as seen in FIG. 2B, to allow gases to reach the electrolyte 102.

SOFC's have adopted stabilized zirconia for oxygen ion conducting electrolyte layers for several decades. Due to the low ionic conductivity at low temperature, such SOFC's have to be operated above 800° C. High operation temperature limits the choice of materials for stacking and sealing and brings in numerous problems (corrosion and degradation for example). These problems have so far resulted in high costs and limited applications, even though SOFC's have many advantages over the other power systems (environment protection for example). Therefore, lowering the operating temperature of a SOFC in a stationary power system is desirable. Other potential applications, including electric vehicles and portable electronics, are another driving force to lower the operating temperature of SOFC. One way to achieve lower operating temperatures is by choosing ceramic electrolytes with higher oxygen ion conductivities at lower temperature. Another way is by reducing the thickness of the electrolyte membrane.

Doped ceria is one of the suitable electrolyte candidates for low-temperature SOFC. One common dopant is $Gd_2O_3$ and typical composition for Gd-doped Ceria is $Gd_{0.2}Ce_{0.8}O_{1.9-x}$ (GDC). Oxygen ion conductivity in doped ceria is understood to be two to three orders higher than that of yttria stabilized zirconia (YSZ) at low temperatures. Doped ceria has not been successfully used in a SOFC because it will transfer into a mixed conductor under reduced atmosphere and as a result short-circuit the cell at around 700° C. Fortunately, the ionic domain of doped ceria increases as the temperature decreases. At a temperature of 500° C., with a favorable SOFC anodic condition, the ionic transference number of doped ceria is larger than 0.9. Therefore, doped ceria is one of the suitable candidates for low temperature SOFC.

Thus, there is a need for a solid oxide electrolyte membrane with high ionic conductivity and physical properties that allow solid-state ionic devices to be able to operate at low temperatures.

SUMMARY

This document describes thin film solid oxide electrolyte membranes.

DESCRIPTION

Figure 1:
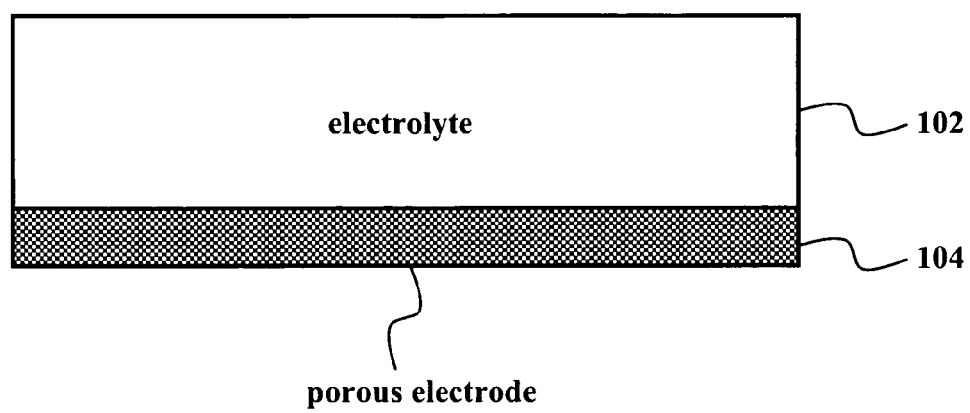
FIG. 1 shows a prior art electrolyte and porous electrode combination.
Figure 2A:
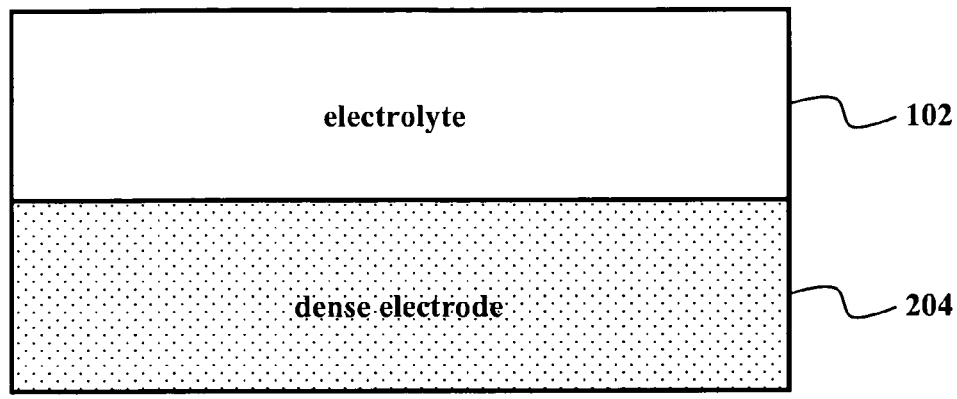
FIGS. 2A-B show a prior art electrolyte and dense electrode combination.
Figure 2B:
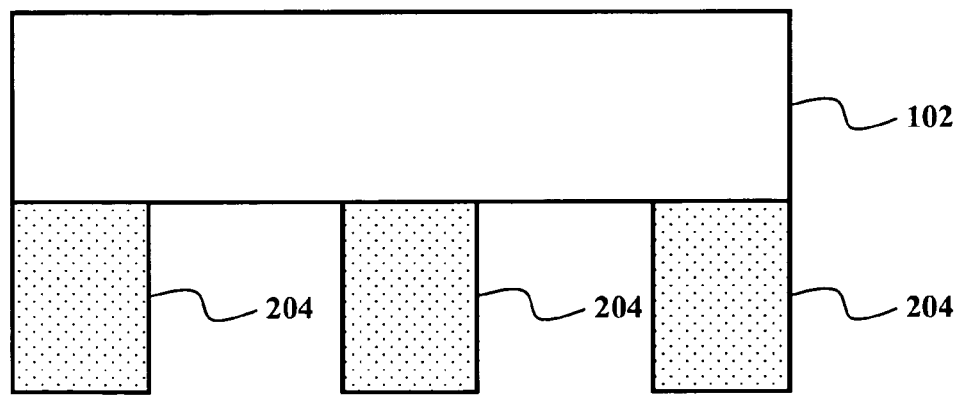

The present invention provides nano-scale thin solid oxide electrolyte membranes, which can significantly reduce ionic resistance loss from the electrolyte as well as catalytic loss from charge transfer reaction that occurs at gas/electrode/electrolyte triple phase boundaries. One preferred embodiment is based on:
1. Conventional ion conducting materials, such as, but not limited to stabilized zirconia or doped ceria, as solid electrolyte membranes.
2. Decreasing area specific resistance from the electrolyte as a result of the decrease of the thickness and/or increase of the ionic conductivity.
3. Increase of the ionic conductivity due to one or more of the following reasons: elimination of cross grain boundaries, self-generated ion highways resulting from segregation of dopants or space charge overlapping, artificially generated ion highways like irradiation-induced dislocations.
4. Increase of the charge transfer reaction rate as a results of special surface charge and/or electric field distribution.

Some of the advantages of the present invention over existing devices and methods include:
1. High power density/efficiency fuel cells and highly sensitive gas sensors at lower operating temperatures due to the low area specific resistance from electrolyte and high charge transfer reaction rate.
2. Solving high temperature operation problems caused by difference of thermal expansion coefficient between electrode and electrolyte materials, and also enabling free device design by enlarged availability of materials including metals and polymers.

For practical application the resistance per $cm^2$, the so called area specific resistance (ASR), from the electrolyte is desirably less than 0.1 ohm per $cm^2$. Since ASR changes proportionally to the thickness of the electrolyte, with an inverse relationship with ionic conductance, it is beneficial to use a thin film electrolyte in a SOFC for lower operating temperatures. The ASRs of YSZ and GDC were calculated assuming 10 μm and 100 nm thickness in the temperature range of 100° C. to 1000° C. The 10 μm thick electrolyte is mostly applied in either laboratory or pilot-line SOFC systems. The minimum operating temperature by using 10 μm YSZ and GDC as an electrolyte will be 700° C. and 500° C. respectively. As the thickness of YSZ and GDC electrolyte is reduced to 100 nm, the operating temperature of SOFC can be decreased down to 400° C. to 200° C. by neglecting the limitations from the electrode reaction.

There have been many recent studies on sintered electrode supported thin film SOFC's. The typical electrolyte thickness found in most of these studies is around 5-20 μm, with operating temperatures in the range of 500-1000° C. Although sintered-fabricated electrodes offer a porous morphology for gas diffusion, it is difficult to deposit a thin, pinhole free electrolyte layer onto these electrodes, because the pore sizes are usually larger than the thickness of the electrolyte. In addition, the sintering method is not compatible with semiconductor fabrication techniques. In contrast, sputtering methods are widely used in semiconductor process flows and can yield a range of film morphologies (i.e. dense or porous films) by adjusting deposition parameters, such as gas pressure, deposition power and deposition temperature. We find that the ability to fabricate sputtered, nanoporous electrodes to be a desirable enabling feature of our design. These nanoporous electrode structures grant process compatibility with our other fabrication steps while also offering the possibility to successfully support a thinner electrolyte.

Theoretically, reducing electrolyte thickness should result in better SOFC performance at a given temperature. However, electrolyte scaling presents several major challenges, such as ensuring the mechanical stability of the structure, maintaining the electrical conductivity of the electrodes, avoiding electrical short circuit problems in the electrolyte, and ensuring gas tightness in the electrolyte layer.

In an effort to reduce electrolyte thickness, several groups have adopted Si-based thin film SOFC's. The thickness of electrolyte in these devices is around 1.2 μm. These studies have used sputtering and photolithographic techniques in their fabrication.

We have targeted even thinner electrolyte layers. The stacking structure of an exemplary thin-film SOFC comprises a 150 nm thick YSZ electrolyte layer sandwiched in-between two layers of 200 nm thick porous Pt electrode. DC- and RF-magnetron sputtering may be used for the deposition of nanoporous Pt and dense YSZ layers respectively. Standard photolithographic techniques may be used to fabricate the layered structure.

For dense substrates, a relative density greater than 80% is preferable. A relative density greater than 90% may be more preferable. A relative density greater than 95% may be even more preferable. The densities are relative to the maximum theoretical material density. If porosity is zero, then relative density is 100%.

A thin smooth YSZ layer may be fabricated between non-smooth nanoporous Pt layers by using a novel fabrication process. YSZ may be deposited on a smooth SiN layer. Pt may be deposited onto the YSZ layer after etching of the SiN. Porous Pt films may be achieved by varying the sputtering conditions (i.e. high Ar pressure and low DC power). Because of the fragile nature of the thin-film structure, a difficult compromise between size and mechanical stability may be made. Employing larger device areas allows greater current/power production, but sacrifices mechanical strength. To ensure the mechanical stability of the membrane, one may use small cell sizes of about 50 μm×50 μm to 400 μm×400 μm. Thus, the effective small fuel cell surface area may range from $2.5 \times 10^{-9}$ to $1.6 \times 10^{-7} m^2$. Examples of side length dimensions for square profiled small fuel cells include 50, 75, 100, 150, 190, 245, 290, 330, 370, 375, and 400 μm. While each individual cell may be extremely small, more than 1500 cells can be realized on a 4-inch silicon wafer. In order to ascertain the optimal compromise between cell size, power density, and mechanical stability, the shape and size of the windows on the silicon wafer as well as the processing methods may be examined in detail. As further characterization, the impedance of the thin film YSZ, as well as OCV and current/voltage curves of the Si-based SOFC's may be measured.

The wafer may be a 4-inch diameter and 375 µm thick (100) silicon wafer with 500 nm of low stress silicon nitride deposited on both sides by Low Pressure CVD (LPCVD). SPR3612 photo resist may be coated on the backside, then exposed and developed by a photo resist spin coater (SVG coater), a optical aligner (EV aligner) and a developer (SVG developer) respectively. Then, the silicon nitride may be etched away in the Drytekl etcher and the residual photo resist was stripped by 90% sulfuric acid/hydrogen peroxide solution (piranha). These processes were implemented in the Stanford nanofabrication facility (SNF).

With respect to the electrolyte, several kinds of materials were examined. A Zr—Y (84/16 at %) alloy target and a Ce—Gd (80/20 at %) alloy target were used for electrolyte deposition using DC-magnetron sputtering. These metal films were oxidized after deposition using the post oxidation method. A 8YSZ (8 mole % yttria stabilized zirconia) target was used in RF-magnetron sputtering. The conditions for each film are summarized in Table 1. After these processes were completed, a porous Pt layer was deposited on top of the electrolyte by DC-magnetron sputtering at 10 Pa and 100 W for 50 to 150 seconds.

Next, Si windows were etched with 30% KOH at approximately 85-100° C. (post-deposition etching). To protect the topside of the sample from KOH, a special wafer holder was used. Also for the same purpose, black wax (Apiezon wax W40) was applied to the top surface. Following this step, a Pt layer was deposited on lower side of the electrolyte layer with the same conditions as the upper Pt electrode.

Another approach is called pre-deposition etching. In this process, the Si may be etched before Pt, YSZ, and Pt are deposited.

TABLE 1

Sputtering conditions for the electrolyte materials

| Target material | YSZ | GDC | YSZ |
|---|---|---|---|
| Sputtering method | DC | DC | RF |
| Gas flow (sccm) | 30 | 30 | Ar: 40<br>O$_2$: 10 |
| Power* (W) | 50-100 | 100-200 | 300 |
| Ar pressure (Pa) | 1-3 | 1-5 | 0.67 |
| Substrate temperature (° C.) | R.T. | R.T. | 200 |
| Time | 100-1200 s | 10-500 s | 4 h 20 m |
| Oxidation temperature (° C.) | 500-700 | 500-700 | N/A |
| Duration (h) | 5 | 5 | N/A |

*The target size for DC- and RF- sputtering may be 2 and 4 inch respectively.

Due to the fragility of the large cell area, we employed smaller cell sizes in the range of 50 µm×50 µm to 400 µm×400 µm.

As will be discussed later, the YSZ film deposited by RF sputtering showed the best property in terms of the electrical short circuit problem. Nevertheless, this YSZ film should satisfy restricted conditions so as not to show short circuit problems. Therefore, the film is preferably deposited on a smooth surface and electrodes are preferably small.

In an exemplary process, Si may be etched and then a YSZ (RF/DC) or GDC (DC) electrolyte layer may deposited on top of the SiN (i.e. pre-deposition etching). Next, 1 cm Pt pads may be deposited through a mechanical mask on the cell. To deposit even smaller electrodes, the lift off process may be employed. In the lift-off process, photo resist (SPR220) may be coated on the YSZ, then exposed and developed. A Pt film may then be deposited on top of the patterned photo resist and the photo resist may be stripped by acetone, resulting in "lift off" of the Pt regions over the photo resist, so that patterned Pt electrodes were obtained. Finally, after the etching of SiN, a Pt layer may be deposited from the backside.

In the post-deposition etching approach, a YSZ (RF) layer and a Pt layer may be deposited on top of SiN. Then, the silicon wafer may be etched through with KOH and the SiN may be etched away by dry etching and a Pt layer may be deposited on the backside of the silicon wafer. In order to avoid using black wax, the wafer holder may be modified for KOH etching.

The impedance of YSZ may be measured with micromanipulators at 350° C. Because a wafer may have different size windows, several cells may be measured. The OCV measurement may be implemented with a dedicated chamber. For the OCV measurement, 3% H$_2$ balanced in N$_2$ was used for the anode, and air was used for the cathode. At 200° C., the theoretical voltage is calculated as follows:

$$E = E_O + \frac{RT}{nF}\ln\left(P_{H_2} P_{O_2}^{1/2}\right)$$
$$= 1.10 \text{ V}$$

where $P_{H2} = 0.03$ atm, $P_{O2} = 0.21$ atm, and $T = 573$ K.

We will now discuss the post-deposition etching approach. Because an experimental wafer holder was dedicated to a 500 µm thick wafer, it did not function for a 300-375 µm thick wafer. Therefore, black wax was employed with the wafer holder.

The obtained samples with the black wax were unpleasant, because the black wax was difficult to remove even with toluene. Therefore the wafer had to sit in the toluene for a long time. Also since the black wax cannot tolerate higher than 80° C., the etching rate was slow. After all, even though free-standing structures were obtained, other ways to fabricate the structure may be employed. Use of a properly sized wafer holder negates the need of black wax in the process.

We will now discuss the pre-deposition etching. Another way to obtain the free-standing structure is to etch Si before film deposition. With this approach, it was revealed that the low stress silicon nitride remains flat after etching Si. Furthermore, even after deposition of the Pt layer, the membrane remains flat. This indicates that the SiN/Pt membrane is mechanically stable. However, the membrane with an electrolyte layer on top of the Pt layer shows a bend.

Though it has been reported that the circular cells may have better mechanical stability, small dimensioned square cells have the advantage of a lower process complexity when compared to circular cells.

For pre-deposition etching, the cells with GDC and YSZ may be deposited by DC sputtering with 1 cm Pt pads may have short circuit problems. Therefore, further smaller electrode sizes with YSZ by RF sputtering were examined. With those, 52×32 cells were realized on a Si wafer. In this approach, the percentage of cells with cracks was observed to be reduced significantly compared to the larger cell size. Also, those cells that did not have cracks did not short circuit. The experimental example consisted of Pt/YSZ (RF)/Pt, whose thicknesses were 200 nm, 140 nm, and 200 nm respectively.

For post-deposition etching, it was expected that the mechanical stability of this approach would be higher than that of the pre-deposition etching approach because the membrane was supported by a rigid substrate during deposition. As expected, the number of cells containing cracks was fewer and the level of bending was mitigated. Because YSZ deposited by RF sputtering did not show short circuit, this type of layer may be used as the electrolyte in this approach.

Figure 3:
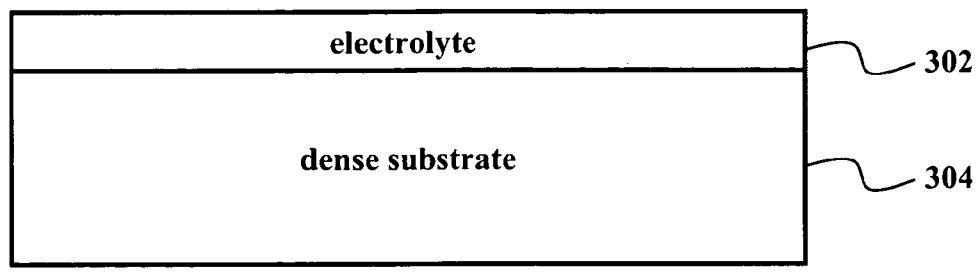
FIG. 3 shows an exemplary electrolyte and dense electrode combination.

FIG. 3 shows an exemplary electrolyte and dense electrode combination. The thin electrolyte 302 is in contact with a dense substrate 304. A smooth substrate 304 allows a thin electrolyte 302. In general, it is preferred that the average roughness (Ra) of the substrate 304 be smaller than the thickness of the electrolyte 302. A Ra that is less than half of the thickness of the electrolyte 302 may be more preferable. An Ra that is less than 25% of the thickness of the electrolyte may be even more preferable. This ensures a continuous, unbroken electrolyte 302. Surface texture, Ra, is a measurement of the average distance between the median line of the surface profile and its peaks and troughs (ANSI B46.1, or DIN ISO 1302).

Figure 4:
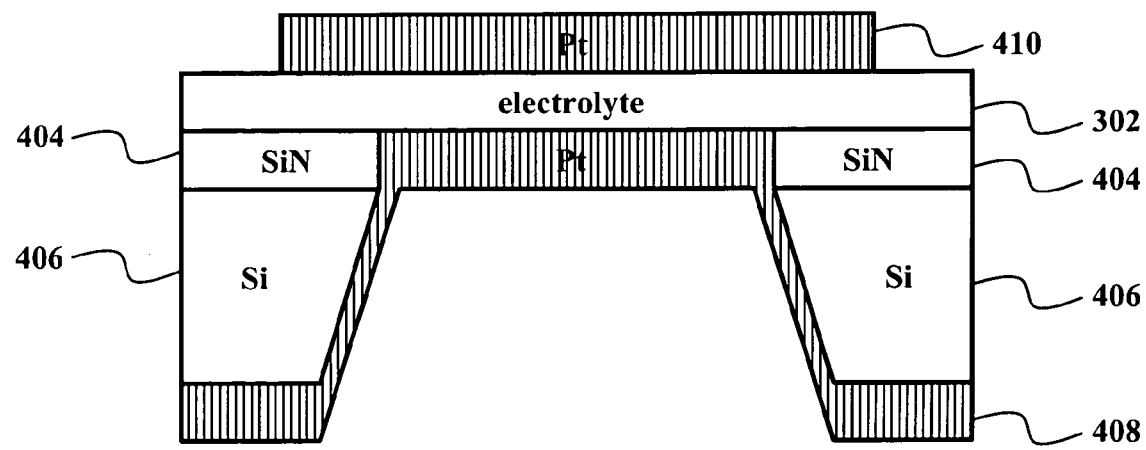
FIG. 4 shows an exemplary fuel cell.

FIG. 4 shows an exemplary fuel cell. A top electrode 410 contacts an electrolyte 302. The electrolyte 302 contacts a bottom electrode 408. The electrolyte 302 contacts a substrate. In this example, the substrate comprise a silicon layer 406 and a top silicon nitride layer 404.

FIGS. 5A-M show an example of a method of making a fuel cell on a dense substrate. In this example, the electrolyte layer 302 is deposited before the bulk of the substrate is etched away.

Figure 5A:
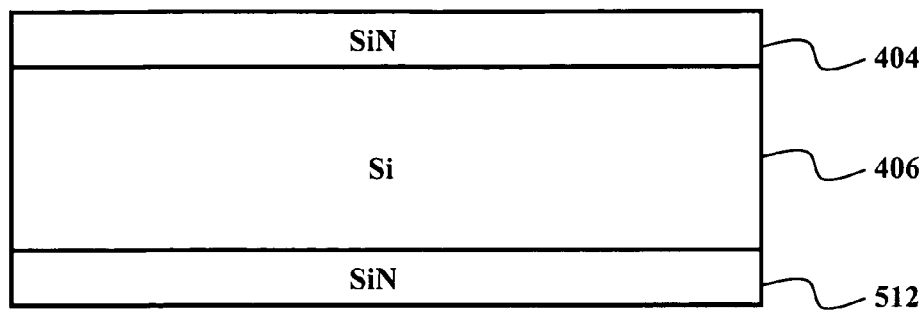
FIGS. 5A-M show an example of a method of making a fuel cell on a dense substrate.

FIG. 5A show an example substrate. In this example the substrate comprises a Si layer 406 that has a SiN coating on the top and bottom sides 404, 512. Examples of thicknesses for the layers are 375 μm for the Si layer 406 and 500 nm for SiN layers 404, 512. It is also possible to use only Si for the substrate. In that case, it is apparent that the construction of a fuel cell would be substantially the same as for the SiN/Si/SiN substrate.

Figure 5B:
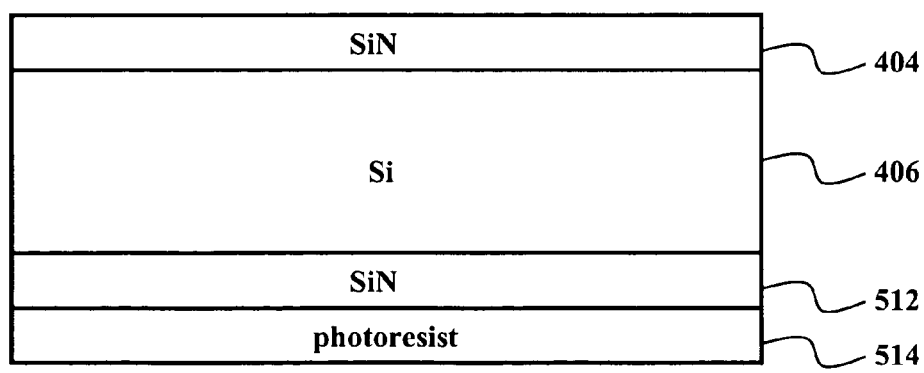

FIG. 5B shows a layer of photoresist 514 deposited on the bottom of the bottom SiN layer 512.

Figure 5C:
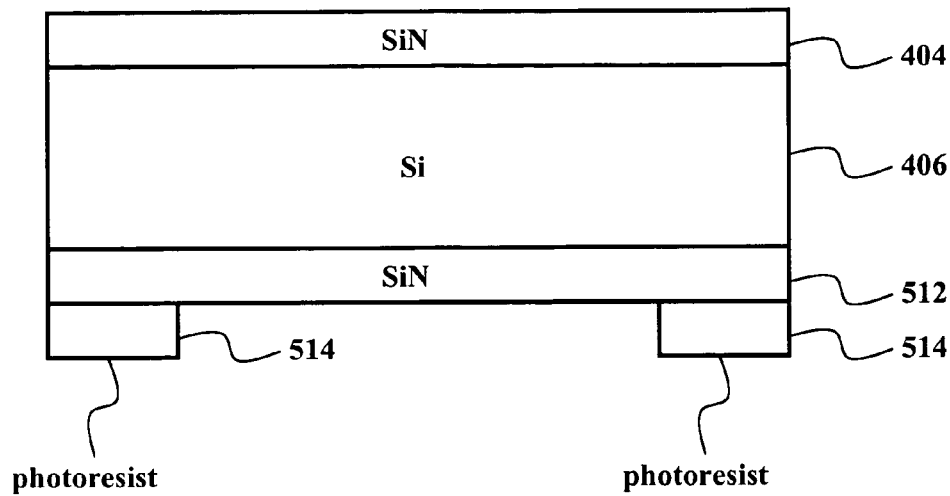

FIG. 5C shows the photoresist 514 exposed to a pattern and developed, which exposes part of the bottom SiN layer 512.

Figure 5D:
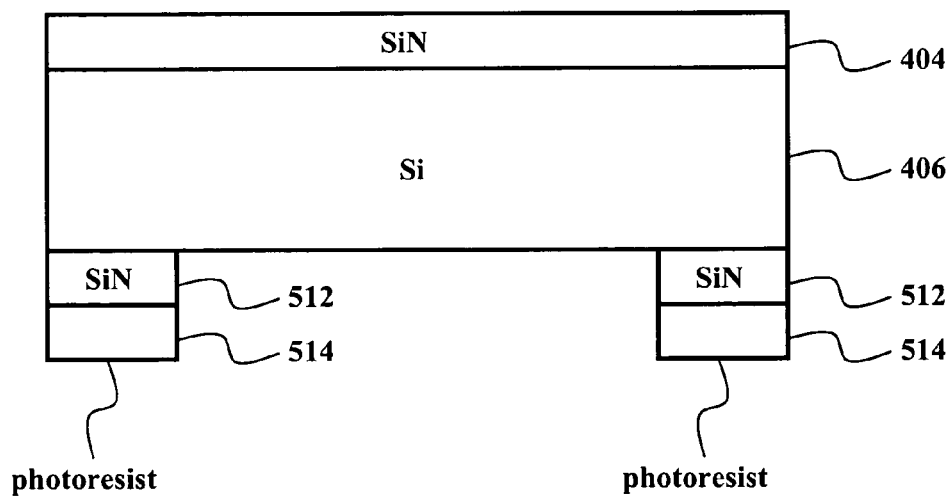

FIG. 5D shows a portion of the bottom SiN layer 512 removed by etching.

Figure 5E:
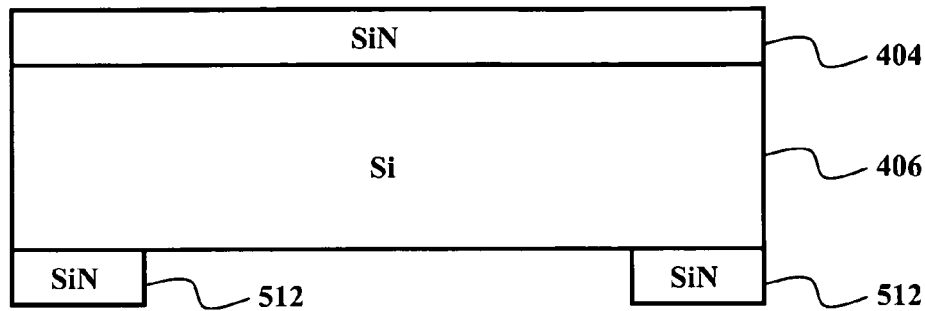

FIG. 5E shows the example with the photoresist 514 removed from the substrate.

Figure 5F:
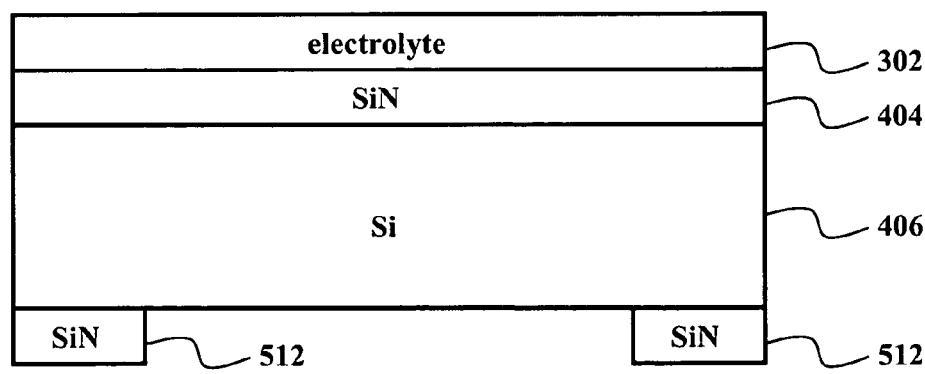

FIG. 5F shows an electrolyte layer 302 deposited on the top SiN layer 404. Examples of the thickness of the electrolyte layer 302 include a range of 50 to 200 nm.

Figure 5G:
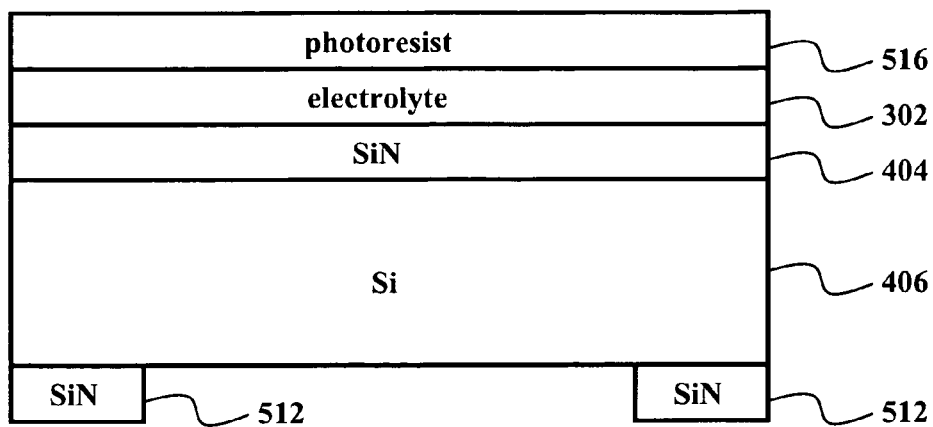

FIG. 5G shows the example with a layer of photoresist 516 deposited on top of the electrolyte layer 302.

Figure 5H:
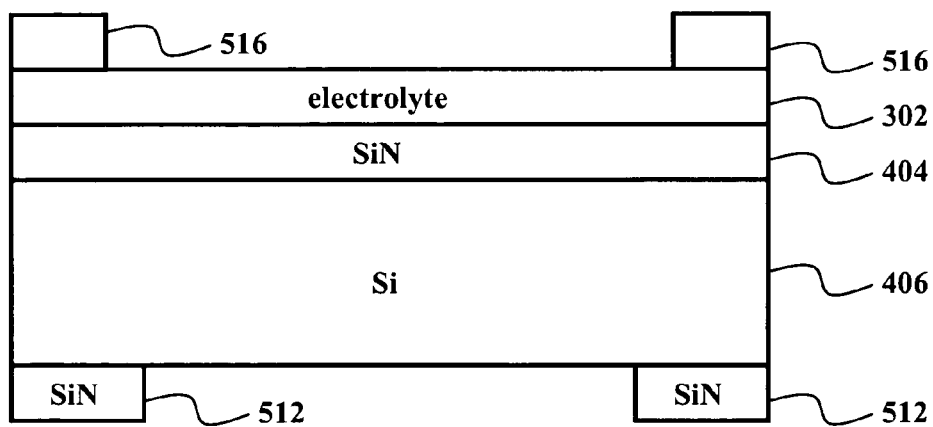

FIG. 5H shows the photoresist 516 exposed to a pattern and developed, which exposes part of the electrolyte layer 302.

Figure 5I:
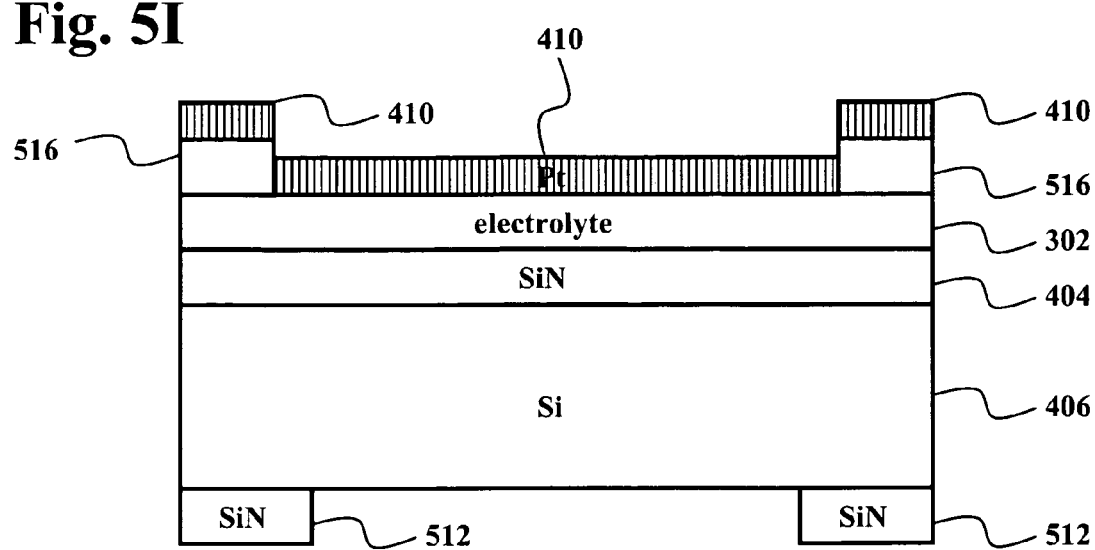

FIG. 5I shows a top electrode layer 410 deposited on top of the electrolyte layer 302 and remainder of the photoresist 516.

Figure 5J:
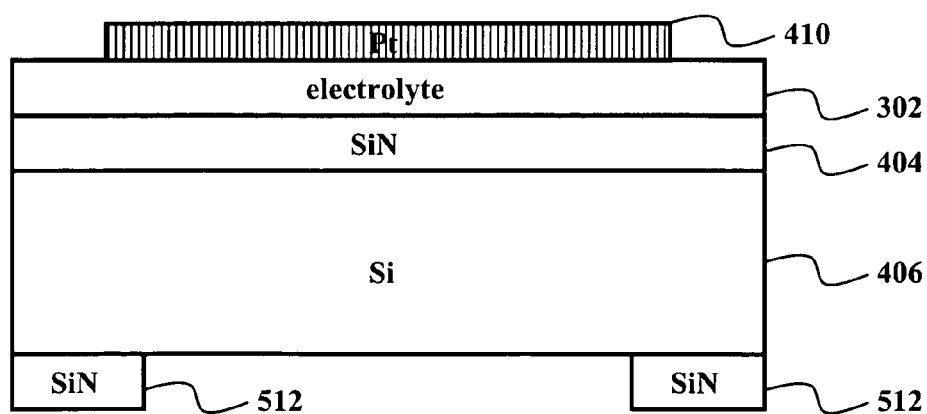

FIG. 5J shows remainder of the photoresist 516, and the portion of the electrode layer 410 that is on top of the photoresist 516, removed.

Figure 5K:
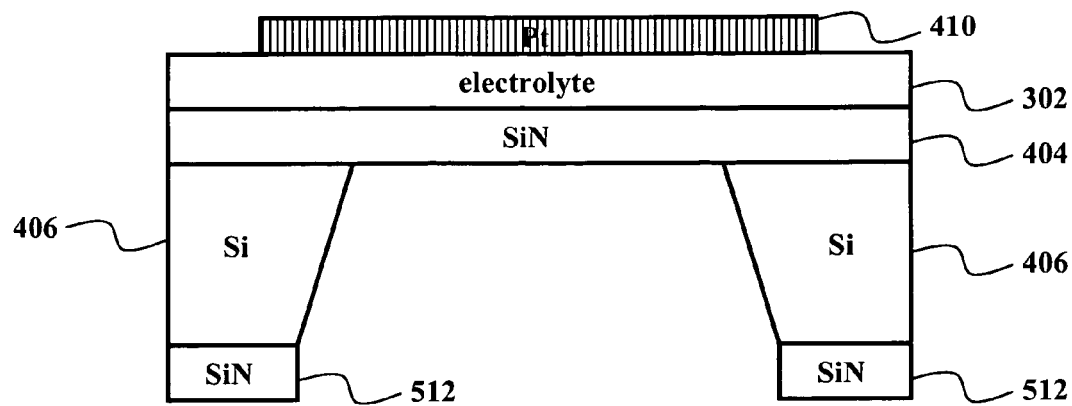

FIG. 5K shows the Si layer 406 etched.

Figure 5L:
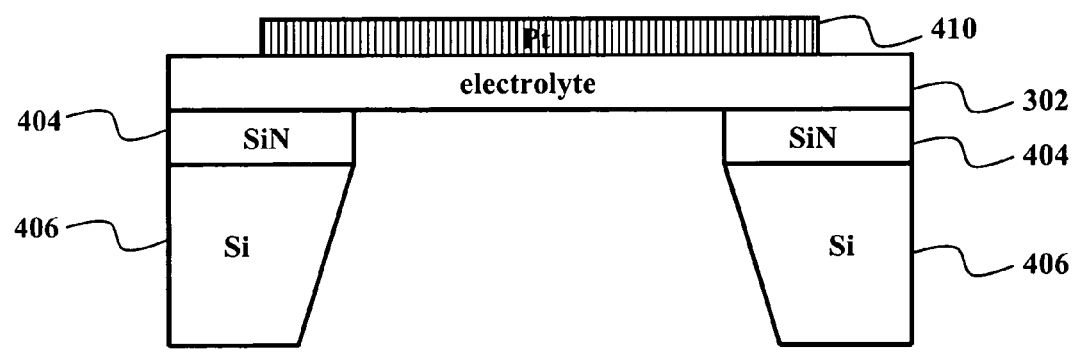

FIG. 5L shows the remainder of the bottom SiN layer 512 and a portion of the top SiN layer 404 etched away. A portion of the electrolyte 302 is now exposed from the bottom.

Figure 5M:
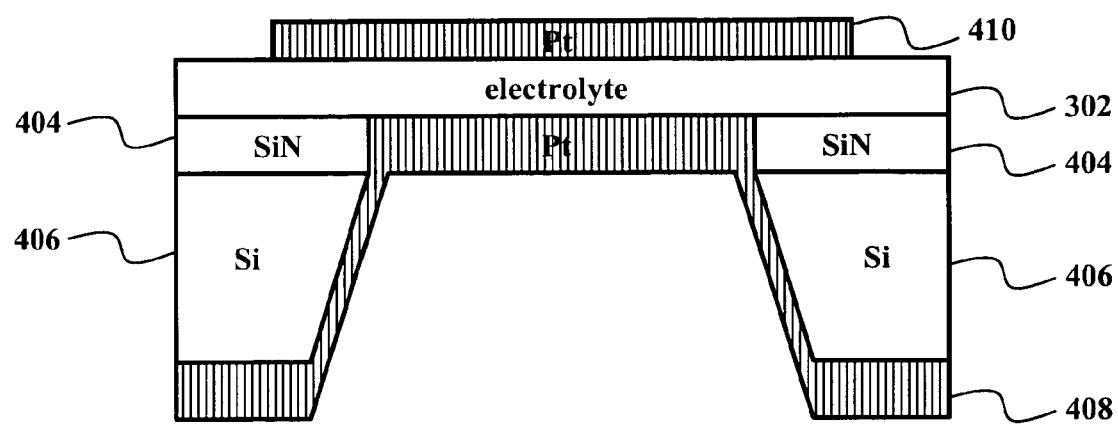

FIG. 5M shows a bottom electrode layer 408 deposited. The bottom electrode layer 408 contacts both the bottom side of the electrolyte 302 and the bottom side of the Si layer 406. The bottom electrode layer 408 is desirably continuous. It is also possible to use a Si substrate. In that case, one would substitute a Si/Si/Si substrate for the SiN/Si/SiN substrate as discussed above.

The etching of the substrate to expose the bottom surface of the electrolyte 302 may occur before or after the deposition of the top electrode layer 410. Atomic layer deposition (ALD) may be used to deposit the various layers. A dense electrolyte 302 layer may be formed by thin film deposition processes such as DC/RF sputtering, chemical vapor deposition, pulse laser deposition, molecular beam epitaxy, evaporation and atomic layer deposition.

Figure 6:
FIG. 6 shows an example of a porous platinum electrode.

FIG. 6 shows an exemplary image of a porous platinum electrode. The image was taken with an electron microscope. One may note the columnar structure of the Pt. The spacing seen in FIG. 6 is on the order of 20 nm. The porous nature of the electrode allows fuels such as $O_2$ and $H_2$ to reach the electrolyte through the electrode.

Figure 7:
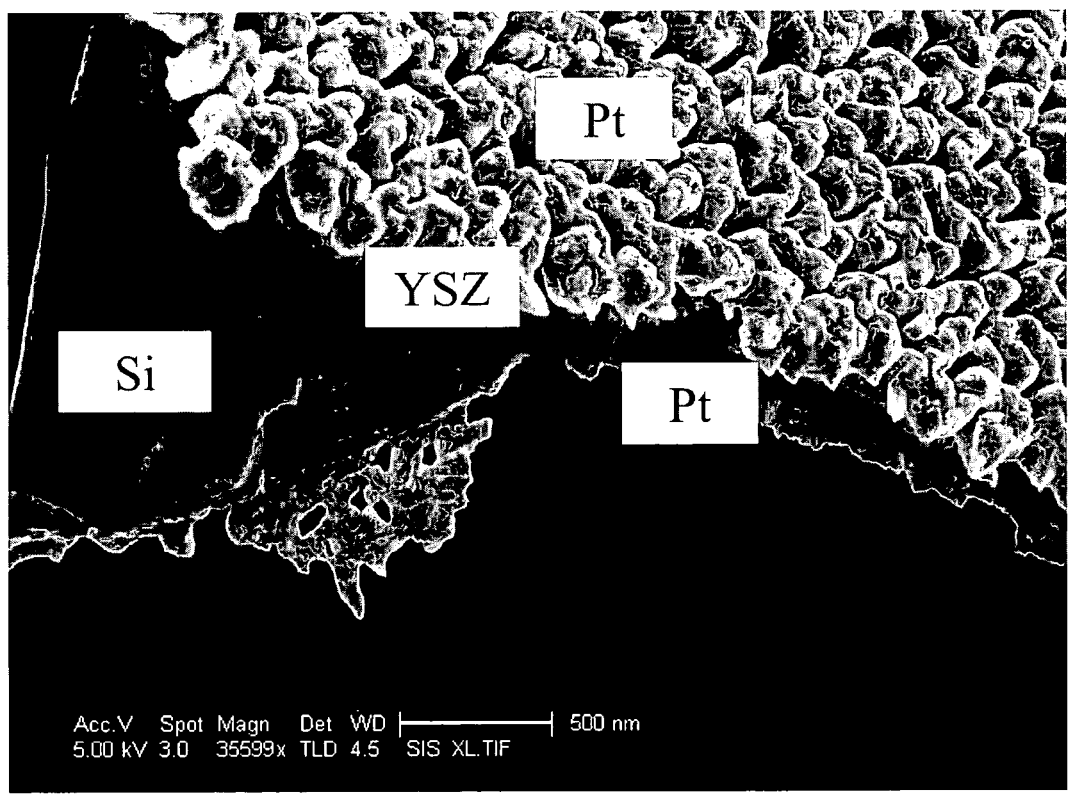
FIG. 7 shows an example of fuel cell with Pt and YSZ.

FIG. 7 shows an exemplary image of a fuel cell with Pt and YSZ. The image was taken with an electron microscope.

Figure 8A:
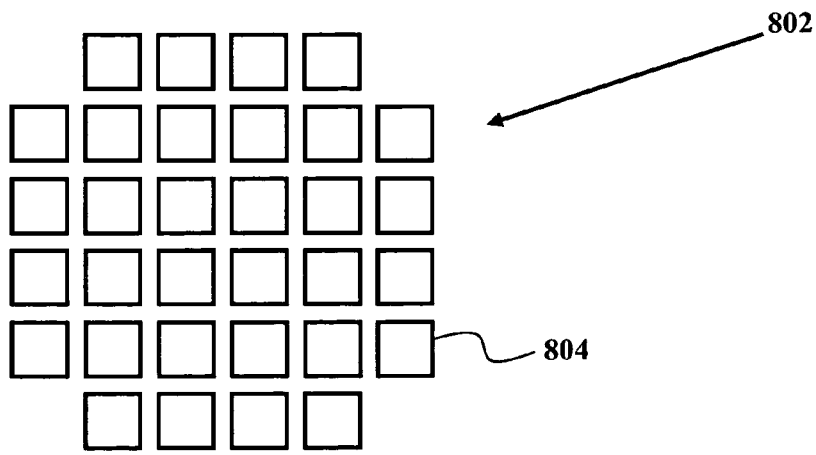
FIGS. 8A-B show examples of how fuel cells may be grouped on a wafer.
Figure 8B:
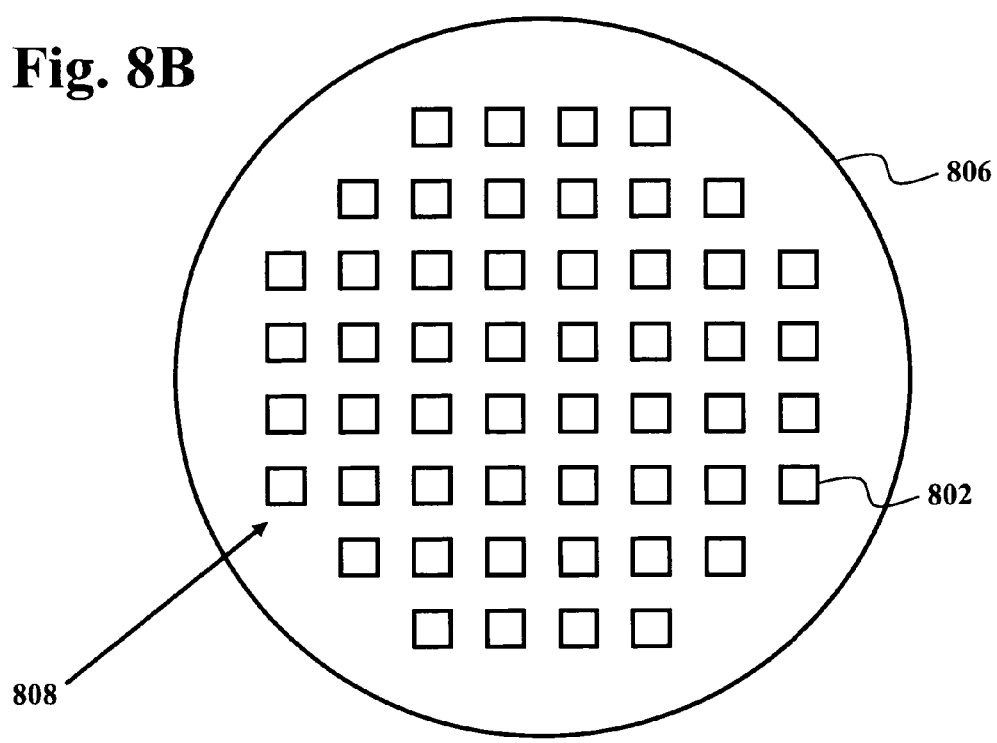

FIGS. 8A-B show examples of how fuel cells may be grouped on a wafer. An collection of individual fuel cells 804, one that may be constructed using the techniques shown in the FIG. 5 series or the FIG. 6 series, may be arranged in a cell cluster 802. Each of the small squares 804 in FIG. 8A represents an individual fuel cell. Only one is labeled for clarity. Arranging the fuel cells 804 in a cell cluster 802 allows a large amount of catalytic area to be used while retaining the robust mechanical characteristics of the substrate 806.

FIG. 8B shows an array of fuel cell clusters 802 arranged in a cluster array 808 on a substrate 806. Coated and non-coated Si wafers commonly used in photolithography may be used as the substrate 806.

Solid ionic conductors usually exhibit high diffusivity and conductivity for specific ions, and can be employed as electrolytes in sensors and power sources. Stabilized zirconia and doped ceria, in which oxygen ions are the only conductive species, are two preferred electrolyte materials for fuel cell and gas sensors. In order to be suitable for practical applications, the area specific resistance (ASR) from the electrolyte is desirably less than 1 ohm per $cm^2$. Since the ASR changes proportionally to the thickness of the electrolyte, with an inverse relationship with ionic conductivity, thin solid oxide electrolyte membranes with high ionic conductivity will be beneficial to solid-state ionic devices in order to lower operating temperatures.

Figure 11:
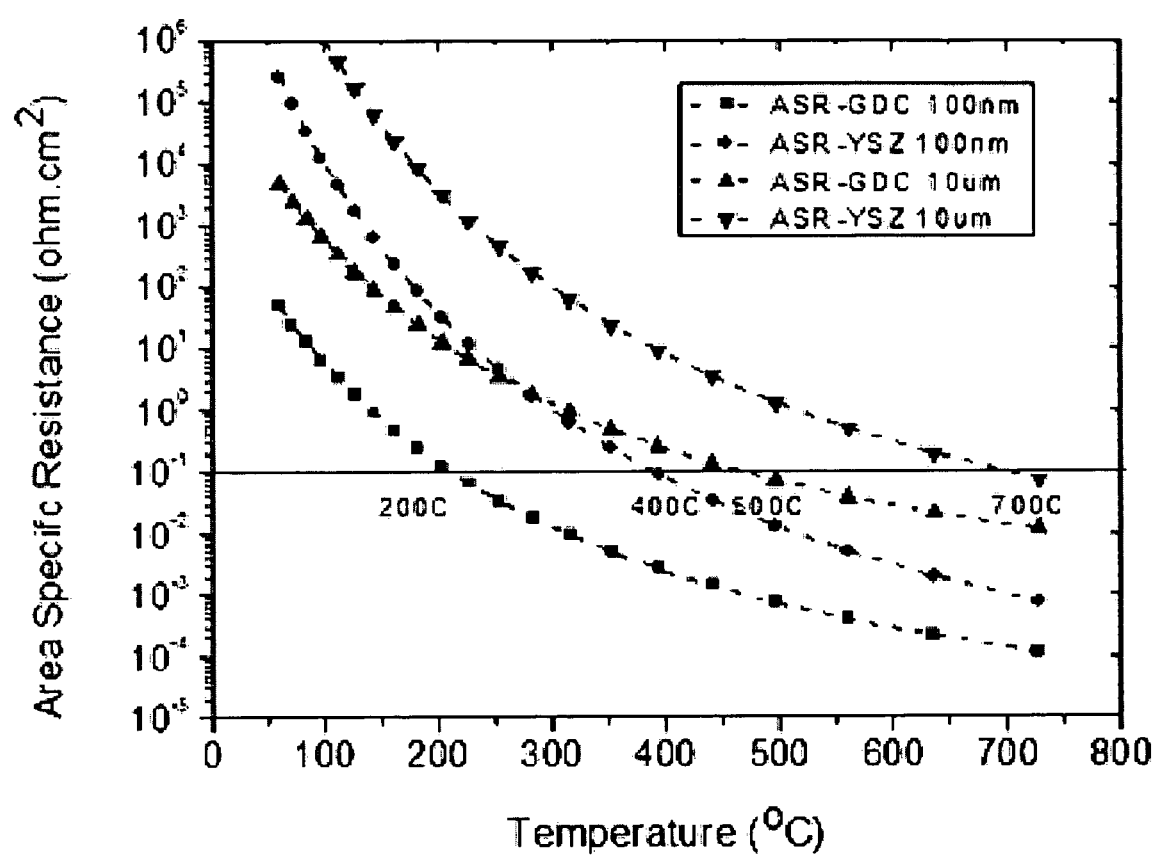
FIG. 11 shows exemplary isothermal curves for area specific resistances of 10 μm and 100 nm thick yttira stabilized zirconia and gadolinia doped ceria.

FIG. 11 illustrates exemplary isothermal curves for area specific resistances of 10 μm and 100 nm thick yttria stabilized zirconia (YSZ) a gadolinia doped ceria (GDC). It should be obvious that with a conventional thick YSZ electrolyte membrane (for example, 10 μm thick), a fuel cell would normally be operated above 700° C. By using 100 nm YSZ or 100 nm GDC, the operating temperature can be lowered down to 400° C. to 200° C., respectively.

Figure 9:
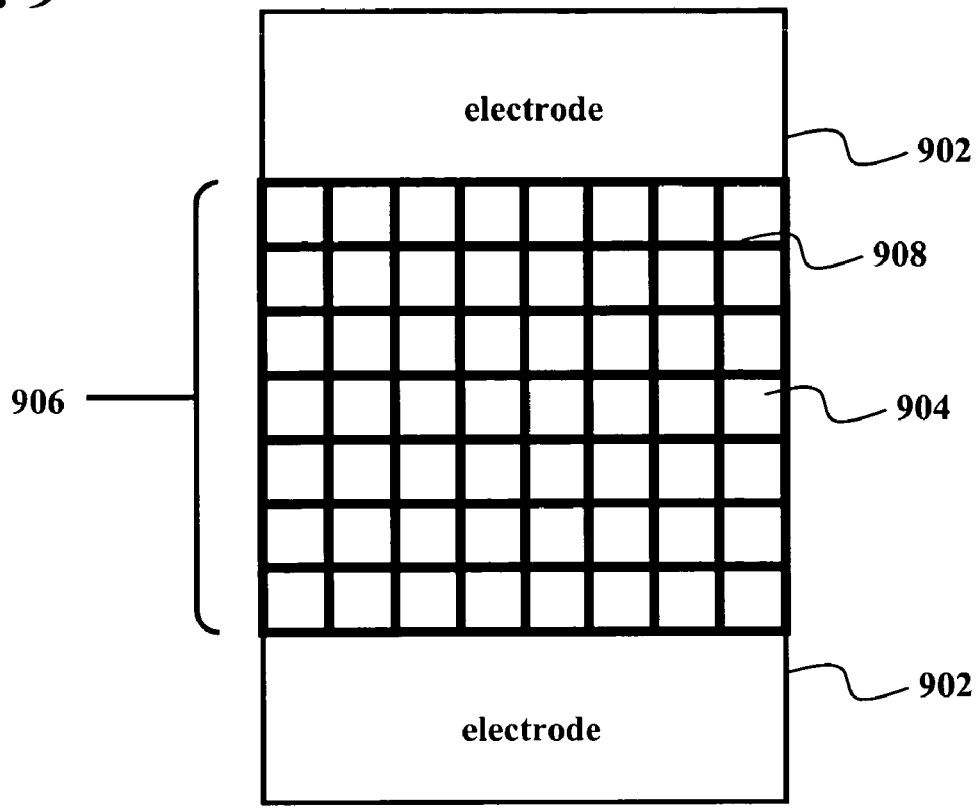
FIG. 9 shows examples of grain boundaries in an electrolyte.
Figure 10:
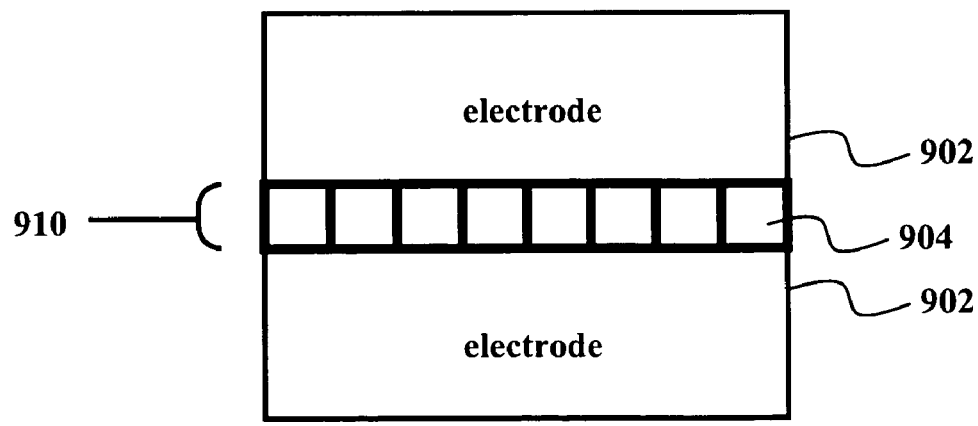
FIG. 10 shows examples of grain boundaries in an electrolyte.

Oxygen ions conduct in ceramics in three modes: within grains, along grain boundaries, and across grain boundaries. Currently in either doped ceria or zirconia, the boundary is considered to be more resistive than the grain interior due to the existence of a grain boundary space charge, accumulation of impurities, and segregation at the boundaries. The grain boundary conductivity is usually reported to be two to three orders higher than grain conductivity. However, these conclusions are all drawn from the experiments on thick films which contain at least tens of grain layers as illustrated in FIG. 9. The blocking effect may result from crossing grain boundaries. It is desirable to eliminate the crossing effect by studying thin GDC films as shown in FIG. 10.

FIG. 9 schematically depicts a solid electrolyte membrane containing cube-like grains. The grains are closely packed in one layer separated by so-called 'along' grain boundaries since these grain boundaries are parallel to the ion transport direction. There are also grains stacked on top of each other since the thickness of the membrane is much larger than the grains. The stacked grains are separated by the so-called 'cross' grain boundaries as these grain boundaries are perpendicular to the ion transport direction. In oxygen ion conductors, ionic conductivity across grain boundaries (also called grain boundary conductivity) is generally known to be two to three orders of magnitude lower than that in the grains (called bulk conductivity) at elevated temperature. A thin solid electrolyte membrane with thickness comparable to the grain size, as schematically depicted in FIG. 10, is more beneficial since the blocking effect from the cross grain boundaries is eliminated.

FIG. 9 shows an electrolyte 906 sandwiched between two electrode layers 902. There are multiple grains 904 with corresponding grain boundaries 908. For clarity, only one of the grains 904 is labeled. Horizontal grain boundaries 908 are known as 'cross' grain boundaries, because migrating ions cross these boundaries in order to travel from one electrode 902 to another.

Vertical grain boundaries 908 are known as 'along' grain boundaries, because migrating ions travel along these boundaries when moving from one electrode 902 to another. In this example, ions traveling from one electrode 902 to the other cross multiple grain boundaries 908 inside the electrolyte 906 thickness.

FIG. 10 shows a thin electrolyte 910 sandwiched between two electrode layers 902. In this example, ions traveling from one electrode 902 to the other do not cross multiple grain boundaries 908 inside the electrolyte 906 thickness. The ions only cross the grain boundaries 908 that comprise the top and bottom surfaces of the electrolyte.

Experimental data has shown that if the electrolyte layer 910 is equal to or less than the average size of grains 904 in the electrolyte 910, then the ion conduction rate goes up by one to several orders of magnitude. One may postulate that grain boundaries 908 represent an impedance of migration. Therefore, by reducing the size of the electrolyte 910 such that the electrolyte 910 comprises a singular plane of grains 904, one or more orders of magnitude of ionic conductivity can be gained.

Nano-crystalline ionic conductors will exhibit superior ionic conduction properties as described in the following paragraphs. Reducing grain size to tens of nanometers will introduce extensive cross grain boundaries in micron or submicron thick membrane, which is disadvantageous as depicted above. Hence, the thickness of the electrolyte membrane is also desirable to scale down to tens of nanometers.

The solid oxygen-ion conductor has high ionic conductivity based on the defect chemistry, in which a certain kind of aliovalent dopant, (i.e., a dopant of a valence different from that of the host ion) is introduced into the host lattice structure by substitution and hence, generates a corresponding amount of oxygen vacancy. These dopants, in some cases will tend to segregate to the grain boundary region. Such segregation will significantly cause composition redistribution in nano-crystallines and thereby self-generate a highest ionic conduction zone in the grain.

Figure 12:
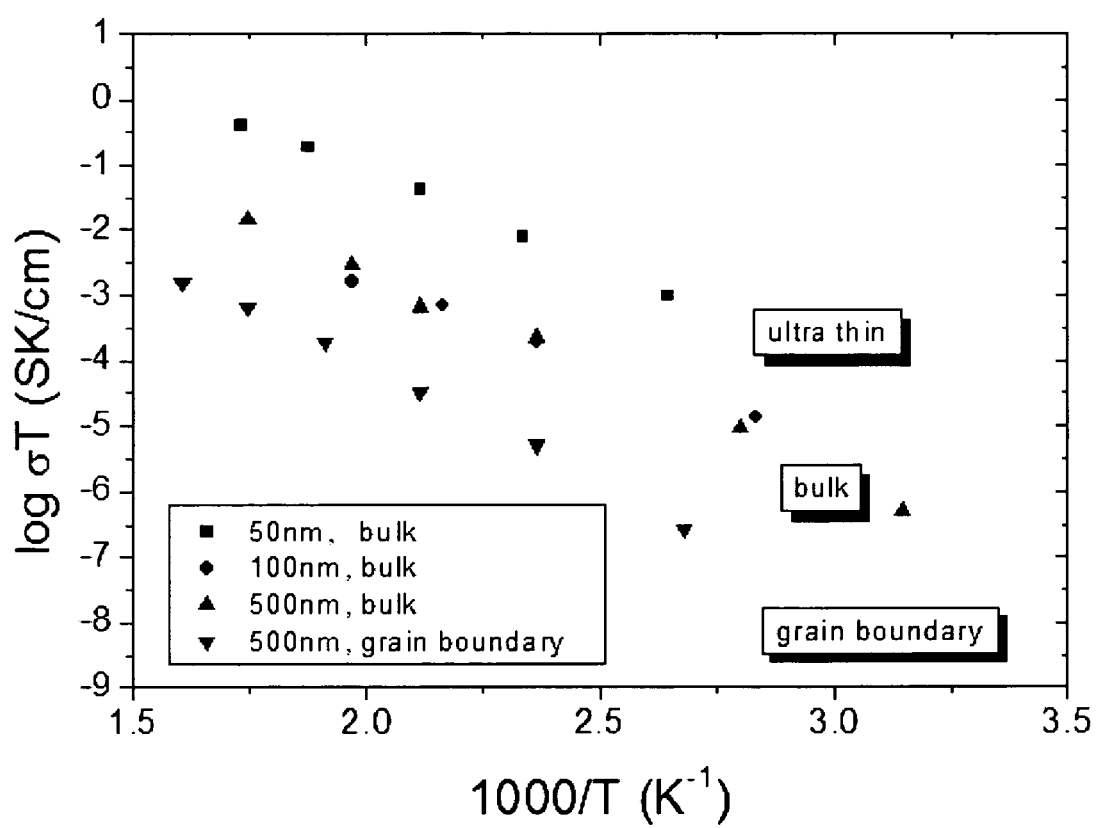
FIG. 12 shows isothermal curves for ionic conductivities of gadolinia doped ceria with various thicknesses.

FIG. 12 shows the plot of logarithm conductivity as a function of reciprocal temperature of 500 nm, 100 nm, and 50 nm thick GDC samples, in which grain size of the in the range of 20 to 50 nm. The values of ionic conductivity cross grain boundaries in the 500 nm thick sample (and others above 100 nm) are two orders of magnitude lower than that inside the grain. The cross grain boundary conductivity in 100 nm or thinner film is hardly observed, which demonstrates that the blocking grain boundary resistance is largely eliminated. The bulk ionic conductivity in 50 nm or less GDC membrane is one order of magnitude higher that that in 100 nm or more GDC membrane due to the dopant segregation resulting in an ion highway zone with the highest conductivity.

As the grain size as well as the thickness of the membrane decreases further to a few nanometers, space charge layer overlapping is expected and may further enhance the ionic conduction. Maier et al. (*Nature*, 408 (2000), pages 946-949) has presented the high conductance performance in $CaF_2/BaF_2$ heterostructure. Maier notes that as each film is thin enough, the space charge regions overlap each other, the two layers lose their individuality, and new conductivity properties form. The overlapping region is another type of self-generated highway for ion transportation.

Irradiation can generate massive dislocations in the solid oxide electrolyte membrane. Since the maximum depth of dislocation region generated by irradiation is 150 nm, only in nano-thin solid electrolyte membrane (less than 150 nm), it is possible to have the dislocation structures open all the way through the membrane. These artificially-generated dislocations may act as ion highways in which ions can transport much faster.

Figure 14A:
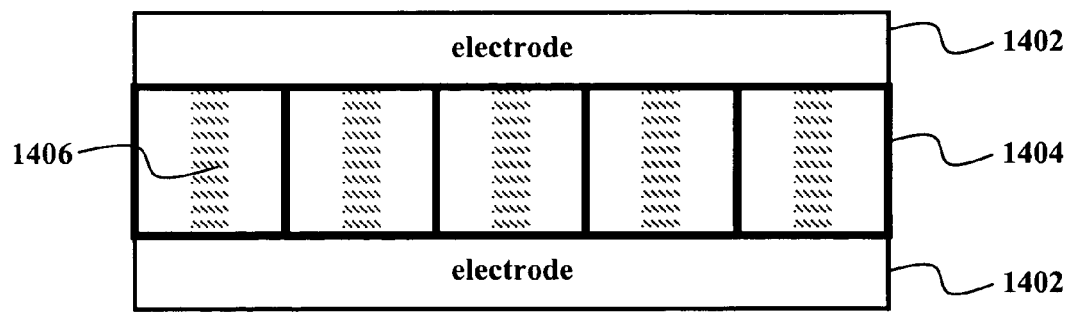
FIGS. 14A-C show examples of ion highways.
Figure 14B:
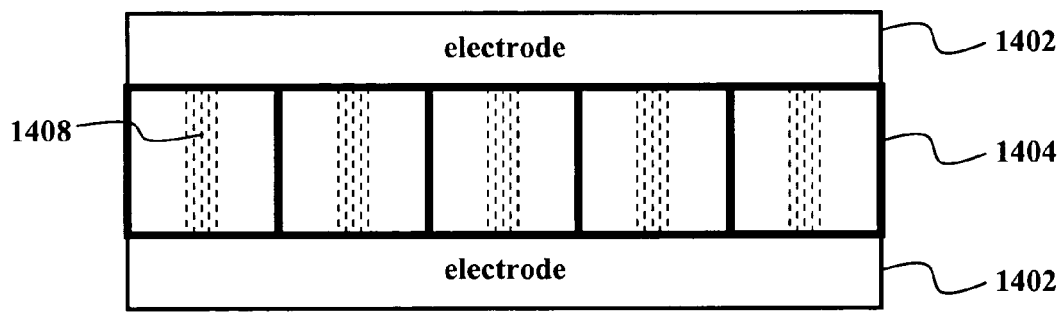
Figure 14C:
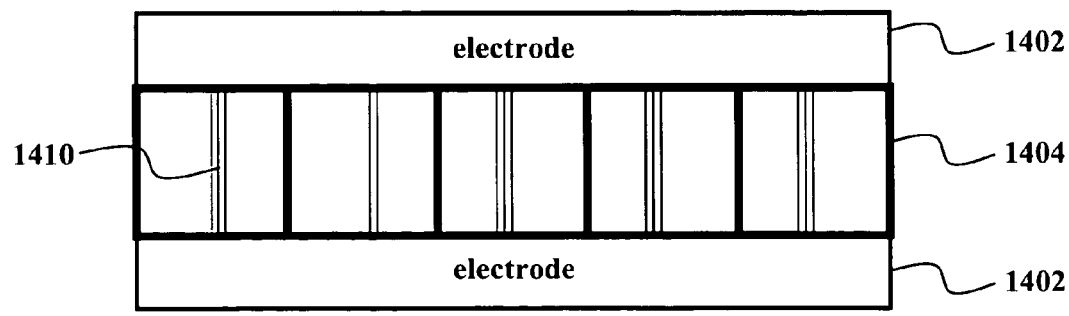

FIGS. 14A-C schematically depicts the above three kinds of ion highways in nano-thin solid electrolyte membrane whose thickness is comparable to the grain size. Shown are electrodes 1402 and electrolyte grains 1404. Each of the figures shows five grains 1404. For clarity, only one grain 1404 is labeled.

FIG. 14A shows ion highways 1406 in the grains 1404 self generated by dopant segregation. FIG. 14A shows five ion highways 1406. For clarity, only one ion highway 1406 is labeled.

FIG. 14B shows ion highways 1408 in the grains 1404 self generated by space charge overlapping. FIG. 14B shows five ion highways 1408. For clarity, only one ion highway 1408 is labeled.

FIG. 14C shows ion highways 1410 in the grains 1404 induced by irradiation. FIG. 14C shows five ion highways 1410. For clarity, only one ion highway 1410 is labeled.

When a fuel cell is working as an electrical power generator, oxygen molecules are split into electrons and oxygen ions at the airside before oxygen ions propagate through the electrolyte membrane. The reaction rate is another factor that will influence the fuel cell. The reaction rate is sometimes referred to in terms of exchange current density. When the thickness of electrolyte membrane is reduced to less than 200 nm, it has been observed that not only the area specific resistance from electrolyte is reduced as described above, but that the reaction rate is also increased by one to two orders of magnitude.

Figure 13:
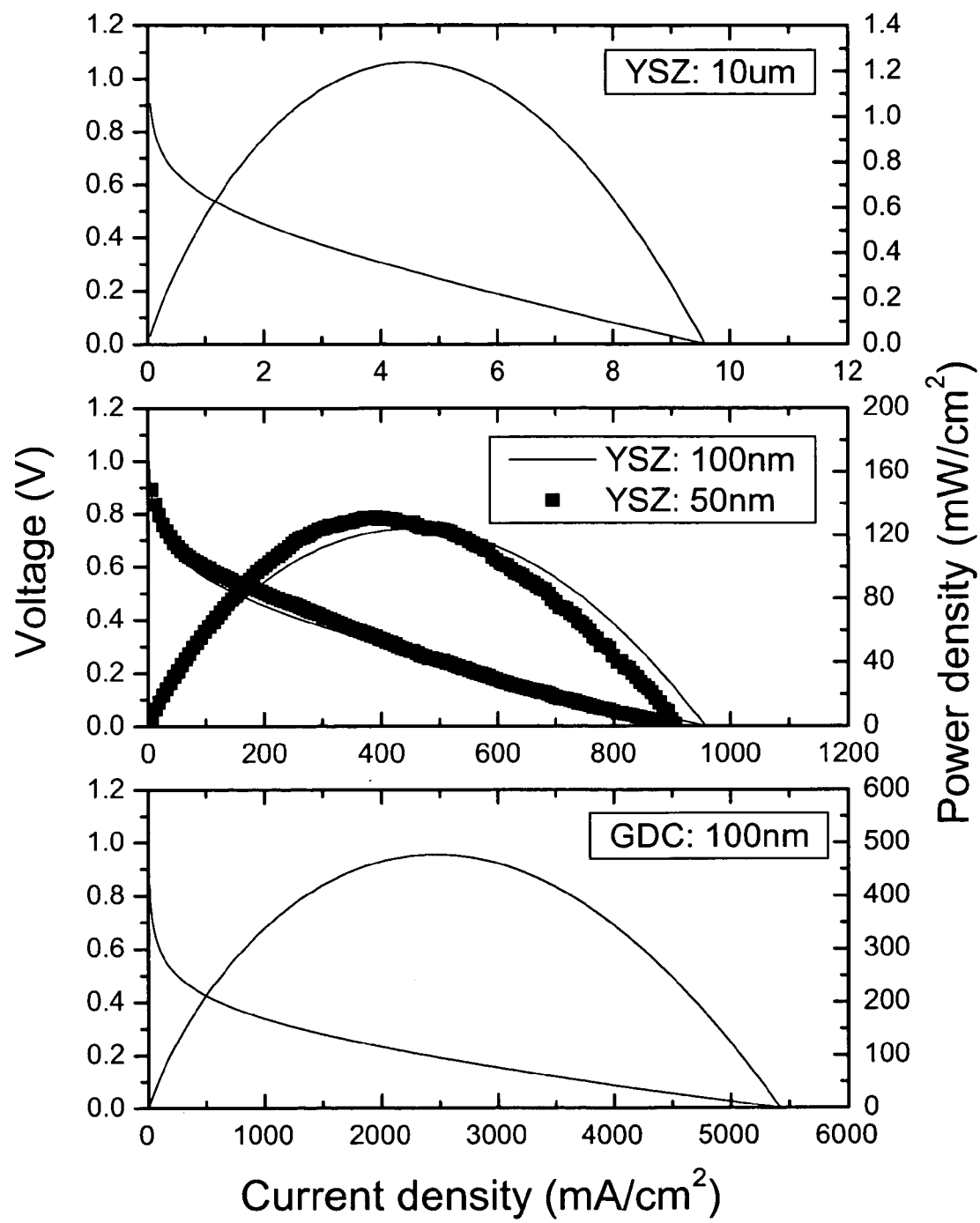
FIG. 13 shows an example of calculated fuel cell performance vs. experimental data.

FIG. 13 illustrates calculated fuel cell performances at 350° C. when 10 μm and 100 nm 8 mole % yttria-stabilized zirconia and 10 mole % gadolinia-doped ceria are used as a solid oxide electrolyte. At 350° C. the maximum power density using 10 μm YSZ as solid electrolyte is less than 2 $mW/cm^2$. With fuel cell with a 100 nm YSZ as electrolyte, the maximum power density observed is 140 $mW/cm^2$. With the same electrode/catalyst configuration in a fuel cell with 100 nm GDC as electrolyte, the max power density is expected to be 500 $mW/cm^2$. Experimental data (square symbols, which may look like a very thick black line when plotted) was obtained by using 50 nm 8% YSZ as a solid electrolyte membrane at 350° C. on an exemplary fuel cell structure as illustrated in FIG. 4. The maximum power density has reached 130 $mW/cm^2$.

Nano-crystalline in nano-thin films may have different surface charge distributions. The surface charges may be helpful for gas dissociation combing with the catalyst and may promote ion incorporation into the electrolyte lattice. In this way, the oxygen reaction rate at the triple phase boundary (gas/ catalyst/electrolyte) is faster. Therefore the catalytic loss is decreased and the performance of the solid ionic device is further improved.

Thin Film Preparation

The GDC thin films may be prepared by DC-sputtering technique followed by oxidation in air. The content of an exemplary Cerium/Gadolinium alloy target (from Kurt J. Lesker, PA) is 80/20 at % respectively with purity of 99.9%. The target may be 2.00" in diameter and 0.125" thick. A Si wafer may be selected to be the base substrate in order to be compatible with the state-of-the-art nanotechnology fabrication processes for later-stage fabrication of thin film fuel cell. 500 nm SiN passivation layer may be grown on top of the Si wafer. This SiN layer may be necessary because (i) it is a blocking layer for wet-etching Si, which may be necessary in fabrication of micro-SOFC by MEMS technology; (ii) it is also a buffer layer which can prevent the reaction between Pt and Si at oxidation and characterization temperature regime. In order to perform electrochemical characterization, 200 nm Platinum layer may be sputtered on top of SiN with a 10 nm Titanium adhesion layer. Afterwards, Ce/Gd metallic components may be sputtered with controlled parameters followed by oxidation at 650° C. for 5 hours in air to achieve dense GDC thin film. Thickness variation from 50 nm to 3 µm can be achieved by controlling the sputtering time. On GDC films greater than 200 nm thick, a 200 nm Pt electrode may be deposited by DC-sputtering. On GDC films less than 200 nm thick, micro Pt electrode can be deposited by using Focused Ion Beam (FIB) (from FEI Company).

Morphology

Consider a 50 nm thick GDC sample. The film usually comprises grains with a size of 20-50 nm, which is consistent with AFM (Atomic Force Microscopy) images. From AFM's one can observe that the surface is very smooth with only a few nanometers in height variation. Cross section images may be obtained by milling with a FIB (Focused Ion Beam). The GDC film is relatively dense and the thickness is relatively homogeneous.

Composition

To determine the composition and impurity in the thin film, XPS (X-ray Photoelectron Spectroscopy) measurements may be performed. An exemplary survey scan of the sample surface reveals that there is no indication of other elements except Gd, Ce, O and C, where C is always presented in XPS spectrum. To calculate the ratio of Gd over Ce, scans may be accumulated at Ce 3d peak in the range of 870 and 890 eV and Gd 4d peak in the range of 130 eV and 150 eV. According to peak area calculations, the atomic ratio at the surface between Gd and Ce is around 1:3.7, which is slightly higher than the alloy composition 1:4. Segregation of the Gd to the surface is one well-known reason, and the accuracy of the area calculation is another one. After etching of a few seconds from the surface layer by argon ion bombardment, the Gd/Ce ratio is close to the nominal composition 1:4. An example of an Argon ion bombarding rate is around 0.2 nm/sec at the current to 10 mA on the feature area of 1 mm². The accumulated of Ce 3d, O 1s, and Pt 4f spectra may be recorded periodically (every 50 seconds for example) in order to monitor the composition and hence homogeneity of the film.

The depth of the layer can also be estimated from the depth profile when the Pt peak appears in the spectra. One may see a depth profile of Ce 3d, O 1s and Pt 4f. No significant changes of the Ce 3d peak in position and width are possible, indicating the homogeneity of fully oxidized Ce. After etching for a duration (1050 seconds for example), the peak of Ce may completely disappear and the peak corresponding to Pt 4f may show up. The thickness of the ceria layer can be estimated by multiplying the etching time and the etching rate. Hence, the thickness of the thin film, given the example parameters above, is around 210 nm, which is consistent with observation of SEM/FIB pictures.

Electrochemical Characterization

Figure 15:
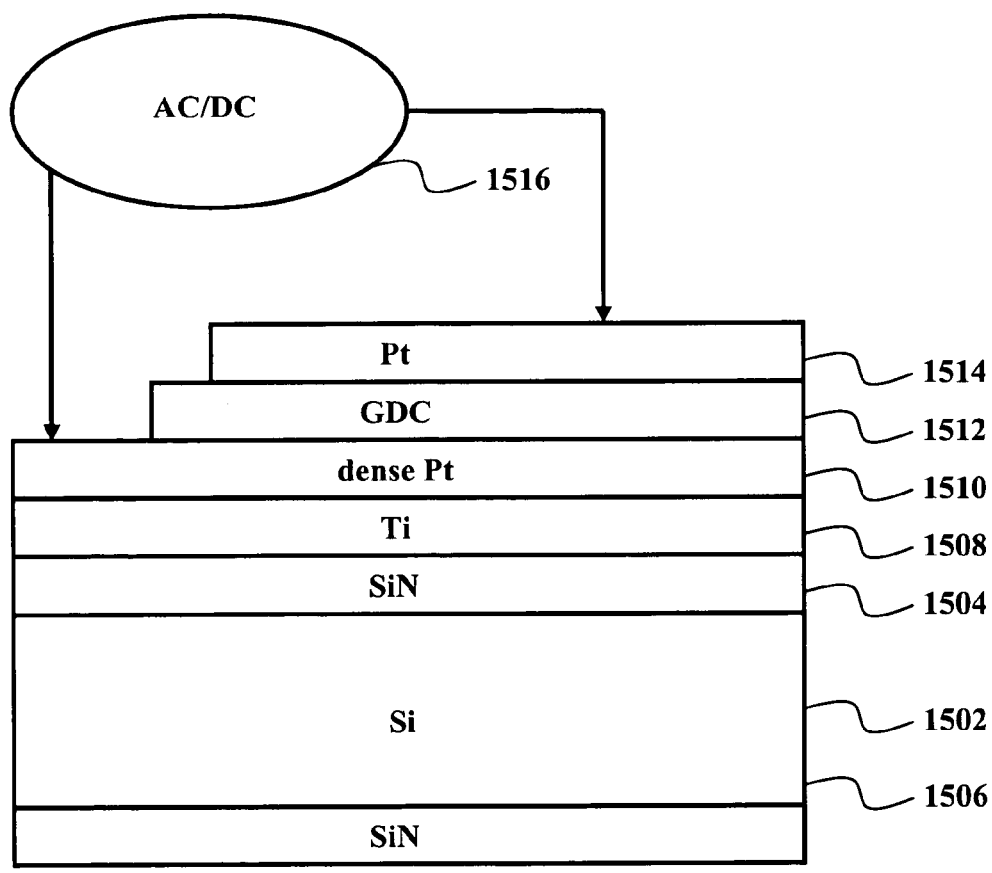
FIG. 15 shows an exemplary dense Pt electrode, GDC electrolyte, and dense Pt electrode combination for electrochemical characterization.

In order to exclude any surface effect on the results, one may perform the direct electrochemical measurements in a cross configuration, as illustrated in FIG. 15. AC impedance and DC polarization data may be obtained from a Solartron 1287/1260 system. To avoid pinholes in the thin film, a micro Pt electrode may be patterned on by FIB. There are at least two possible ways for patterning: (a) direct depositing by FIB, and (b) sputtering large area with Pt and then milling off by FIB. The quality of Pt will be different. Around 50% carbon are contained in the Pt pattern by direct deposition. Micro probes may be used as electrical connectors.

FIG. 15 shows an exemplary dense Pt electrode, GDC electrolyte, and dense Pt electrode combination for electrochemical characterization. A substrate may be made out of a Si wafer 1502 that has a top SiN coating layer 1504 and a bottom SiN coating layer 1506. A titanium layer 1508 may be deposited to aid adhesion between the dense Pt layer 1510 and the SiN layer 1504. A GDC electrolyte layer 1512 is deposited on the dense Pt layer 1510. A Pt layer 1514 is deposited on the GDC electrolyte layer 1512. The layers may be deposited such that a current source 1516 can access the Pt layers 1510, 1514. The SiN layers may optionally be omitted.

DC Characteristics

The polarization profile of a Pt/GDC (1 µm)/Pt system may be obtained at the room temperature and 300° C. Positive as well as negative polarization voltages with a value of 50 mV may be applied. An exponential current drop may be observed. At room temperature, the initial current was observed to be around 1e-8 A and after 2500 seconds, the current stabilized in the range of 4e-10 A. As both electrodes are ionic blocking electrode at room temperature, the remained current may be due to the electronic conductance in the electrolyte and/or due to the limitation of the instrument. The ionic transference number can be estimated according to the following equation, $t=1-I_\infty/I_o$, where $I_\infty$ and $I_o$ are the currents measured at the equilibrium time and the beginning, respectively. Hence, the ionic transference number of our GCO thin film at room temperature and 300° C. was observed to be greater than 0.98 and 0.96 respectively.

One may also measure the cyclic voltammetry profiles at room temperature. The scan rate may vary from 1 mV/s to 0.1 mV/s and the scan window may be set to +0.8 and −0.8 V vs. the counter Pt electrode. The current may start to increase at 0.75 V, indicating an ongoing reaction process. This may be due to the adsorbed water deposition. The thin film after CV measurement was subjected to impedance measurement again and no changes of the conductance were found, indicating that the thin film and GDC were stabilized in the potential region. Thus, the prepared GDC thin film is suitable to work as an oxygen ionic conductance within 1 V voltage at room atmosphere.

AC Impedance Analyses

Impedance spectra may be recorded in air upon increasing temperatures from 100° C. up to 350° C. on the thin films with various thicknesses. Impedance data may be retrieved by fitting the spectra using Z-view software based on non-linear least square method. Typical Cole-Cole plots may be obtained from samples with various thicknesses at 150° C.

For a 700 nm thick sample, the plot may be fitted with two semicircles corresponding to bulk and grain boundary resistance. By decreasing the thickness, the resistance corresponding to grain conductance may be observed to decrease significantly and become invisible for a 50 nm thick sample.

The conductivity of thin film GDC may be plotted as a functional temperature and activation energy (Ea) calculated from a slope changing trend with the thickness of the film. One may note that ionic conduction behaves differently in different thickness regimes. Films thicker than 1 μm exhibit conventional impedance spectra with two arcs corresponding to bulk and cross grain boundary conductance with activation energy of 0.7 and 0.85 eV, respectively. The cross grain boundary conductivity was observed to be two orders of magnitude lower than bulk conductivity, indicating the significant blocking. As the thickness decreases, the grain boundary conductivity increased to the bulk conductivity level with activation energy was observed to decrease to 0.6 eV. Beyond 100 nm only one arc was observed in the impedance spectra. The conductivity was observed to be around one order of magnitude higher than bulk conductivity and the activation energy kept at 0.6 eV.

The improvements by using nano-thin solid electrolyte membranes can be the results of reducing the resistance loss from the electrolyte due to the decrease of the membrane thickness and/or due to the increase of the ionic conductivity that occurs when the membrane thickness is comparable to the grain size. The increased ionic conductivity can be the results of elimination of cross grain boundaries and/or containing special ion highways for transportation resulting from the segregation of the dopants, space charge overlapping, and irradiation-induced dislocations.

The improvements by using such nano-thin solid electrolyte membrane can also be the results of reducing the catalytic losses from charge transport reactions that occur at gas/electrode/electrolyte triple phase boundaries due to the special distribution of the surface charges as well as electric fields.

It will be apparent to one skilled in the art that the described embodiments may be altered in many ways without departing from the spirit and scope of the invention. Accordingly, the scope of the invention should be determined by the following claims and their equivalents.

We claim:
1. A solid oxide fuel cell comprising:
   a. a silicon substrate, wherein said substrate comprises a low stress silicon nitride layer deposited on both sides, wherein a portion of said silicon nitride is etched away on at least one side, wherein a residual portion of said silicon nitride layer provides a surface for deposition;
   b. an electrolyte membrane deposited to said residual silicon nitride layer, wherein the electrolyte membrane comprises one layer of ionic conductor grains, wherein the thickness of the electrolyte membrane is substantially equal to an average thickness of the ionic conductor grains, wherein ions crossing said electrolyte membrane do not cross grain boundaries within the electrolyte; and
   c. a columnar electrode disposed on said electrolyte membrane, wherein said columnar shape minimizes electrical short circuiting across said fuel cell.

2. The electrolyte membrane of claim 1, wherein the electrolyte membrane comprises stabilized zirconia.

3. The electrolyte membrane of claim 1, wherein the electrolyte membrane comprises doped ceria.

4. The electrolyte membrane of claim 1, wherein the electrolyte membrane is manufactured by vapor deposition.

5. The electrolyte membrane of claim 1, wherein the electrolyte membrane has a thickness of 150 nm or less.

6. The electrolyte membrane of claim 1, wherein the electrolyte membrane has a thickness of 100 nm or less.

7. The electrolyte membrane of claim 1, wherein the electrolyte membrane has a thickness of 50 nm or less.

8. The electrolyte membrane of claim 1, wherein the electrolyte membrane comprises a catalytic supporter for catalysts.

9. The electrolyte membrane of claim 1, wherein the electrolyte membrane operates in a temperature range of between 200 and 700 degrees C.

10. The electrolyte membrane of claim 9, wherein the electrolyte membrane operates in a temperature range of between 400 and 600 degrees C.

11. The electrolyte membrane of claim 9, wherein the electrolyte membrane operates in a temperature range of between 200 and 400 degrees C.

* * * * *